United States Patent
Cortequisse

(10) Patent No.: US 9,739,163 B2
(45) Date of Patent: Aug. 22, 2017

(54) STRIP FOR ABRADABLE IN A COMPRESSOR TURBINE

(71) Applicant: Techspace Aero S.A., Herstal (Milmort) (BE)

(72) Inventor: Jean-Francois Cortequisse, Heers (BE)

(73) Assignee: Safran Aero Boosters SA (BE)

( * ) Notice: Subject to any disclaimer, the term of this patent is extended or adjusted under 35 U.S.C. 154(b) by 307 days.

(21) Appl. No.: 14/567,674

(22) Filed: Dec. 11, 2014

(65) Prior Publication Data
US 2015/0176423 A1    Jun. 25, 2015

(30) Foreign Application Priority Data

Dec. 20, 2013    (EP) ..................................... 13199231

(51) Int. Cl.
| | | |
|---|---|---|
| F01D 11/12 | (2006.01) | |
| F16J 15/453 | (2006.01) | |
| F01D 25/24 | (2006.01) | |
| F01D 25/04 | (2006.01) | |

(52) U.S. Cl.
CPC .......... *F01D 11/122* (2013.01); *F01D 25/246* (2013.01); *F16J 15/453* (2013.01); *F01D 25/04* (2013.01); *F05D 2260/96* (2013.01); *F05D 2300/603* (2013.01)

(58) Field of Classification Search
CPC ...... F01D 11/12; F01D 11/122; F01D 11/125; F01D 11/127; F01D 25/246; F01D 25/04; F05D 2300/603; F05D 2260/96; F05D 2260/963; F16J 15/543; F16J 15/453
USPC .................. 415/9, 119, 173.1, 173.4, 173.5; 277/414, 415
See application file for complete search history.

(56) References Cited

U.S. PATENT DOCUMENTS

| | | | |
|---|---|---|---|
| 4,392,656 A | | 7/1983 | Tirole et al. |
| 5,974,782 A | * | 11/1999 | Gerez ................... F01D 21/045 415/9 |
| 6,203,273 B1 | * | 3/2001 | Weiner ................. F01D 11/025 415/131 |

(Continued)

FOREIGN PATENT DOCUMENTS

EP    2418387 A1    2/2012

OTHER PUBLICATIONS

European Search Report from corresponding EP 13199231.1 mailed May 23, 2014.

*Primary Examiner* — Christopher Verdier
(74) *Attorney, Agent, or Firm* — Polster Lieder

(57) ABSTRACT

A sealing device of an axial turbomachine, comprising a circular strip with an outer surface and an inner surface; an annular layer of abradable material on one of the outer and inner surfaces of the strip, designed to provide a sealing with an annular row of rotor blades. The surface of the strip covered by the abradable layer comprises at least two perforated circular zones, each with a series of distributed perforations. The surface of the strip covered by the abradable layer further comprises a smooth circular zone disposed axially between the perforated areas. The smooth zone is centered on the outer ends of the rotor blades. The smooth circular zone and the two perforated circular zones improve the adhesion of the abradable layer on the metal strip, and avoid a premature breakdown of the abradable layer in contact with the rotor blades, despite the presence of perforations.

21 Claims, 2 Drawing Sheets

(56) References Cited

U.S. PATENT DOCUMENTS

| | | | |
|---|---|---|---|
| 7,775,766 B2 | 8/2010 | Meier et al. | |
| 2003/0156940 A1* | 8/2003 | Czachor | F01D 21/045 415/119 |
| 2007/0122269 A1* | 5/2007 | Meier | F01D 11/122 415/173.1 |
| 2009/0196730 A1* | 8/2009 | Jahns | F01D 11/10 415/1 |
| 2010/0284789 A1* | 11/2010 | Brooks | F01D 5/26 415/119 |
| 2013/0129494 A1* | 5/2013 | Duchaine | F01D 9/041 415/191 |

\* cited by examiner

STRIP FOR ABRADABLE IN A COMPRESSOR TURBINE

This application claims the benefit, under 35 U.S.C. §119, of EP 13199231.5, filed Dec. 20, 2013, the disclosure of which is incorporated herein by reference in its entirety.

FIELD

The invention relates to a sealing device for an axial turbomachine. More specifically, the invention relates to a composite wall of a compressor of an axial turbomachine with a sealing device provided with a layer of abradable material and a circular strip interposed between the abradable layer and the wall. The invention also relates to an axial turbomachine.

BACKGROUND

To increase the performance of a turbomachine, compressors, fans and turbines have seals. Seals made of abradable material are disposed on the surfaces of the stator and cooperate with the rotor. In particular, abradable seals are disposed on the inner surface of the casing of the low-pressure compressor and provide a sealing with the rotor blades of the compressor.

In order to lighten the casing of the compressor, it is known to manufacture the casing in a composite material with organic matrix and carbon fibers. However, the adhesion between the abradable material and the composite material of the casing is weak because of the differential expansion. To counter this effect, a metal strip is interposed between the casing and the abradable. The strip is bonded to the casing and its surface is perforated to improve the anchorage of the bonding material to the strip.

Patent document published EP 2 418 387 A1 discloses a composite casing of a compressor of an axial turbomachine. The casing includes a layer of abradable material with a metal strip or foil interposed between the abradable layer and the organic matrix composite casing. To improve the cohesion to the composite casing, the strip has a perforated surface.

However, these perforations weaken the abradable material in contact with the rotor blades of the compressor. In operation, due to repeated contacts between the rotor blades and the abradables, the latter shows a premature degradation and possibly a loss of cohesion. Therefore, the abradable seal no longer performs its function.

SUMMARY

The object of the invention is to solve at least one of the technical problems presented by the prior art, and keep at least one of the advantages mentioned. The object of the invention is also to increase the sustainability of a sealing device of an axial turbomachine, with a circular strip provided with a layer of abradable. The object of the invention is further to reduce the cost of manufacturing a sealing device of an axial turbomachine, the device having a circular strip receiving an abradable layer.

It will be understood that the invention provides a circular strip of a turbomachine comprising an annular layer of an abradable material, and a surface covered by the layer of abradable material showing a smooth circular zone and a perforated circular zone where perforations are distributed.

The invention relates to a sealing device of an axial turbomachine, comprising a circular strip with an outer surface and an inner surface, and an annular layer of an abradable material disposed on one of the outer and inner surfaces of the strip. The abradable layer is designed to ensure a sealing with a turning component of the turbomachine relative to the strip, such as an annular row of blades. The surface of the strip covered by the abradable layer comprises at least one circular zone that is perforated with a series of perforations distributed over the zone, remarkable in that surface of the strip covered by the abradable layer further comprises a smooth circular zone.

According to various embodiments of the invention, the circular strip is a metal strip such as a metal foil, in various embodiments the surface of the strip covered by the abradable layer is an inner surface of the strip, the abradable layer optionally clogs the perforations in the perforated zone.

According to various embodiments of the invention, the smooth zone is delimited axially by the perforated zone, the smooth circular zone extends over at least 20%, for example over the majority, for example over at least 80% of the surface of the strip that is covered by the abradable layer.

According to various embodiments of the invention, the perforations of the perforated zone are spaced at a regular grip, the axial length of the smooth zone is greater than 5 times, in various embodiments greater than 20 times the average spacing between the perforations.

According to various embodiments of the invention, the circular strip has a constant thickness of 0.05 mm and 2 mm; for example between 0.10 mm and 0.60 mm; fore example between 0.15 mm and 0.20 mm, the zones can form annular tapes.

According to various embodiments of the invention, the perforated zone comprises at least 5 holes per $cm^2$ having a diameter less than or equal to 2.00 mm, for example at least 30 perforations per $cm^2$ having a diameter less than or equal to 0.15 mm, or for example at least 100 perforations per $cm^2$ having a diameter less than or equal to 0.09 mm.

According to various embodiments of the invention, the perforated zone and the series of perforations are respectively a first circular perforated zone and a first series of perforations, the surface of the strip covered by the abradable layer further comprises a second perforated circular zone with a second series of perforations distributed over the second zone, the smooth zone being arranged axially between the first zone and the second zone, the strip can include an axial alternating of smooth zones and perforated zones.

According to various embodiments of the invention, the abradable layer extends axially over the entire axial length of the strip and/or the strip extends axially over the entire axial length of the abradable layer.

According to various embodiments of the invention, the sealing device comprises an annular wall which comprises an inner surface on which the strip is disposed, the annular wall optionally includes a plurality of annular layers of abradable material and a plurality of strips which are inserted between the wall and each abradable layer.

According to various embodiments of the invention, the strip is attached to the annular wall using glue or adhesive applied on at least one perforated zone. In various embodiments, the glue or adhesive can be only applied on each perforated zone, optionally the annular wall comprises at least one annular flange which extends radially and which comprises fastening means such as fixing holes.

According to various embodiments of the invention, the annular wall comprises an organic resin such as epoxy, and a fiber preform, optionally with glass fibers or carbon. In various embodiments, the preform can comprise a stack of sheets with woven fibers.

According to various embodiments of the invention, the wall includes an annular row of stator blades with platforms fixed to the wall and forming an annular row, the strip being axially delimited at one of its upstream and downstream edges by the annular row of blade platforms. In various embodiments, the wall comprises at least two rows of blades with platforms fixed to the wall in annular rows which delimit the upstream and downstream sides of the strip.

According to various embodiments of the invention, the thickness of the platforms of the stator blades is substantially equal to the sum of the thickness of the strip and the thickness of the abradable layer. In various embodiments, the blade platforms comprise stop surfaces which cooperate axially with the strip.

According to various embodiments of the invention, the smooth zone is centered axially on the surface of the strip covered by the abradable layer.

According to various embodiments of the invention, the abradable material comprises an organic material, and/or an elastomeric material, and/or a silicone material.

According to various embodiments of the invention, the smooth zone is unitary, and/or homogeneous.

According to various embodiments of the invention, the strip and/or abradable layer are each formed integrally of the same material and/or each have a material continuity.

According to various embodiments of the invention, the strip has generally parallel circular edges.

According to various embodiments of the invention, the revolution profile of the strip is inclined relative to the axis of rotation of a turbomachine by an angle greater than 2°, for example greater than 5°, for example greater than 10°.

According to various embodiments of the invention, the wall and the strip are made of different materials, for example the density of the wall is lower than the density of the strip.

According to various embodiments of the invention, the strip extends axially between 2% and 50% of the axial length of the wall, for example between 4% and 30%, for example between 6% and 15%.

According to various embodiments of the invention, the wall has a generally constant thickness.

According to various embodiments of the invention, the wall comprises at least one, in various embodiments at least two, annular shoulders delimiting axially the abradable layer and/or the strip.

According to various embodiments of the invention, one of the shoulders is formed in the thickness of the wall.

According to various embodiments of the invention, the blades are fixed only to the wall.

According to various embodiments of the invention, the annular row of platforms form the annular shoulder of the wall, which axially delimits the abradable layer and/or the strip.

The invention also relates to a turbomachine comprising a sealing device, remarkable in that the sealing device is according to the invention, and the turbomachine comprises an annular row of rotor blades which cooperate by abrasion of the abradable layer. In various embodiments the rotor blades have an outer end disposed predominantly in the smooth zone.

According to various embodiments of the invention, each rotor blade includes a leading edge and a trailing edge, the smooth zone is predominantly axially disposed between the leading edges and trailing edges of the blades, at least a perforated zone is disposed at the leading edges and/or at the trailing edges of the blades. In various embodiments the blades are fan blades. In various embodiments he perforations of the strip extend through the abradable layer and communicate with a noise reducing device of the turbomachine.

According to various embodiments of the invention, the turbomachine further comprises a separation nozzle predominantly supported by the annular wall, and/or only fixed downstream to the wall.

The invention improves the cohesion of the layer of abradable material on the strip, notably if formed of a metal foil. In case of contact with the blade tips, the abradable material is less weakened at the smooth zone and does not degrade prematurely. Similarly, in the case of application to a fan casing, the abradable layer is more resistant to abrasion, and keeps the quality reduction of the fan noise. The invention reduces the number of holes necessary for fixing the circular band, thus reducing the manufacturing cost. The sealing device permits to limit leakage between the blade tips and the annular wall. Indeed, the device allows reducing the play at the ends of the rotor blades due to the abradable material, even if there are occasional contacts when the turbomachine is in operation.

DRAWINGS

Figure 1:
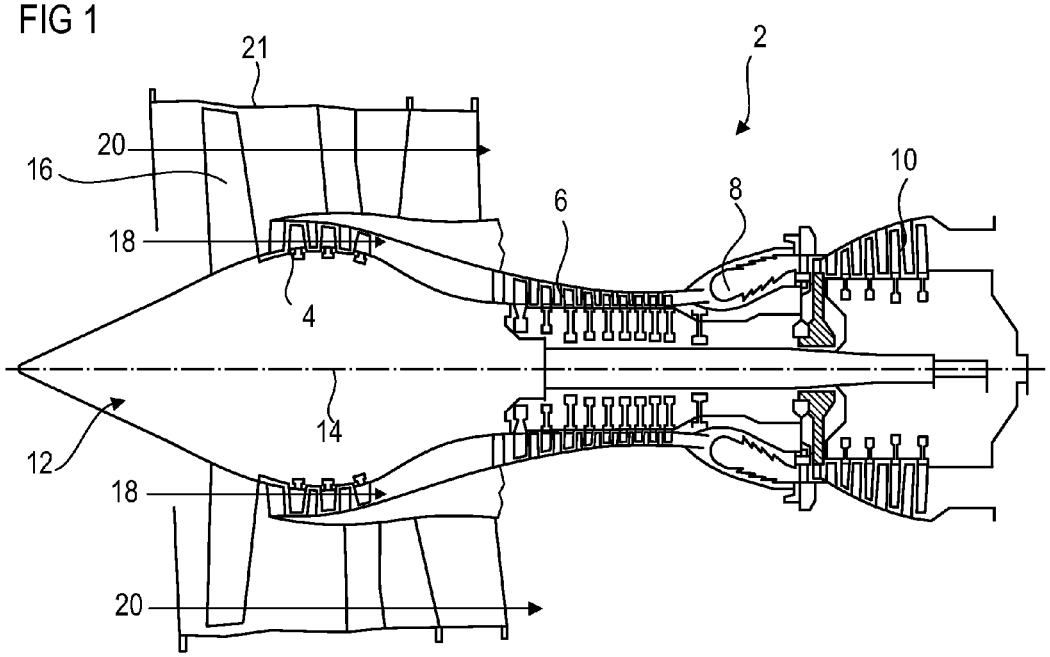
FIG. 1 shows an axial turbomachine according to various embodiments the invention.
Figure 4:
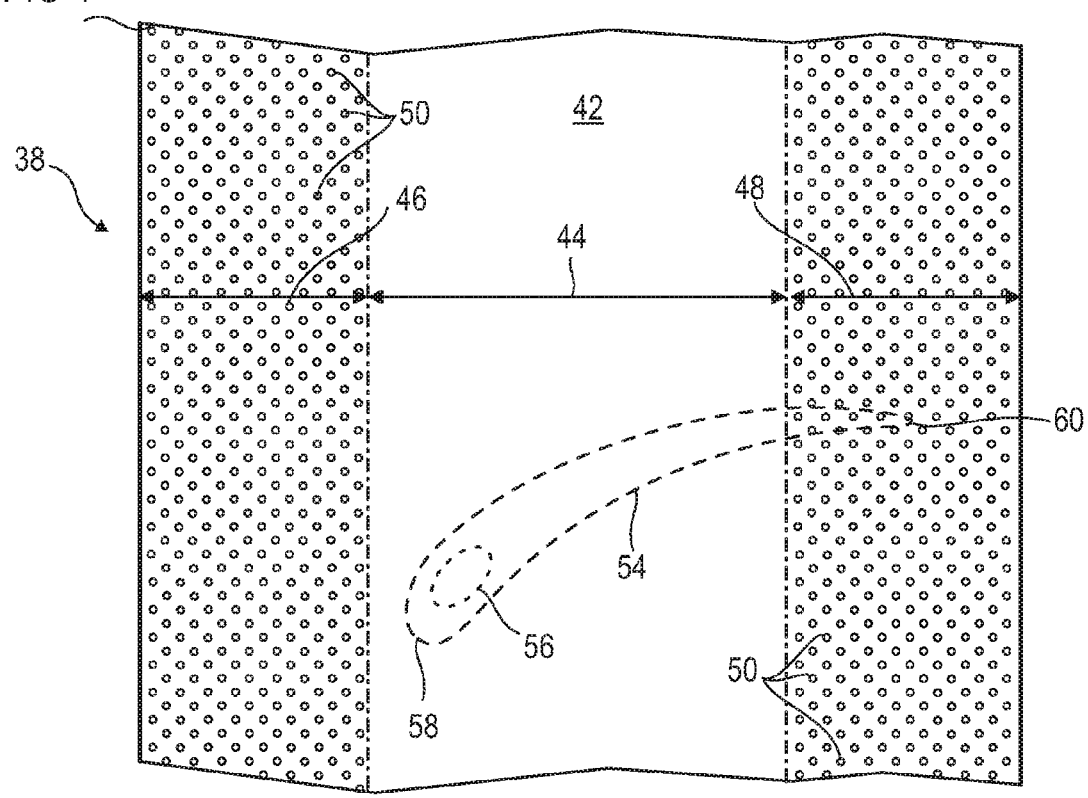

FIG. 4 outlines a strip of a turbomachine shown in FIG. 1 according to various embodiments of the invention.

DETAILED DESCRIPTION

In the following description, the terms internal or inner or interior and external or outer or exterior refer to a position in relation to the axis of rotation of an axial turbomachine. The axial direction is along the axis of rotation of the turbomachine.

It is be noted that, as used herein, the expression "abradable" is commonly used to designate a friable material able to provide some sealing with a mobile surface with respect to this material. This material can have various compositions, structures and shapes. For example, a wall, e.g., an external wall, of a compressor of an axial turbomachine, provided with a layer of this material ensures a rotatable sealing with the ends of the rotor blades of the compressor. This maintains the integrity of the whole assembly despite deformations, even light, inherent to the turbine engine, including blades elongation deformation due to centrifugal forces. By minimizing the clearance between the mobile blades and the casing of the fluid stream, the efficiency and performance of the engine is increased.

FIG. 1 schematically shows an axial turbomachine 2, exemplarily illustrated as a double-flow turbojet. The turbojet 2 comprises a first compression level, called low-pressure compressor 4, a second level of compression, called high pressure compressor 6, a combustion chamber 8 and one or more levels of turbines 10. During operation, the mechanical power of the turbine 10 transmitted via the central shaft to the rotor 12 moves the two compressors 4 and 6. Means for increasing the transmission ratio can increase the speed of rotation transmitted to the compressors. Alternatively, the various turbine stages 10 can each be connected to the compressor stages 4 and 6 via concentric shafts. These include several blade rows associated with stator blade rows. Rotation of the rotor 12 about its axis of rotation 14 generates a flow of air and gradually compresses the latter until the entry of the combustion chamber 8.

An intake fan 16 is coupled to rotor 12. The fan 16 includes one or more annular rows of fan blades, and generates an air flow which is divided into several flows. It can be divided into a primary flow 18 through the various above mentioned stages of the turbomachine 2, and a secondary flow 20 passing through an annular duct (partially shown) along the machine and then joining the main flow at the turbine outlet. The primary flow 18 and secondary flow 20 are annular, they are channeled by the casing of the turbomachine.

In particular, turbomachine 2 can comprise a sealing device with a fan strip 21 having a generally circular shape and that can be made of metal, or polymer. The fan strip 21 is disposed axially at the level of the fan blades. The sealing device can include a fan wall, generally tubular, in various embodiments made of composite material with an inner surface on which the fan strip 21 is disposed. The turbomachine 2 can also comprise a fan noise reduction device disposed around the wall of the fan.

Figure 2:
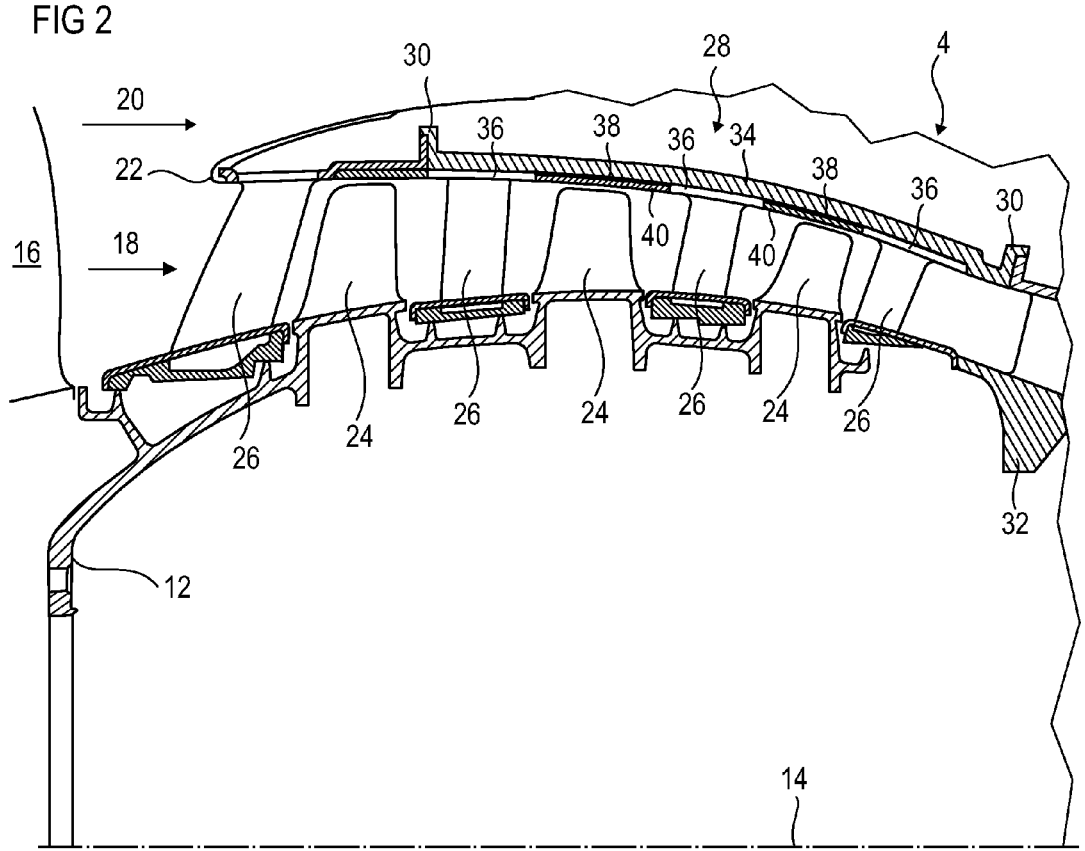
FIG. 2 is a diagram of a turbomachine compressor of the turbomachine shown in FIG. 1 according to various embodiment of the invention.

FIG. 2 is a sectional view of an axial compressor of a turbomachine 2 as that of FIG. 1. The compressor can be a low-pressure compressor 4, it could also be a high-pressure compressor 6. One can observe a portion of the fan 16 and the separation nozzle 22 for the primary flow 18 and secondary flow 20. The rotor 12 comprises several rows of rotor blades 24, in this case three.

To increase the yield, the turbomachine comprises at least one sealing device, possible a plurality of sealing devices which are associated with rows of rotor blades 24, for example in the low-pressure compressor 4. At least one sealing device can comprise an outer casing 28 with an annular wall 34. The wall 34 can comprise at least one, e.g., two, annular flanges 30 disposed upstream and downstream of the wall 34, for example for fixing the separation nozzle 22 and/or for securing the outer casing 28 to an intermediate casing of the turbomachine 32. The casing 28 can be formed of two half shells separated by a plane extending axially. The low-pressure compressor 4 can be defined by the outer casing 28. The sealing device can comprise at least one, for example, several rows of stator blades 26.

The low-pressure compressor 4 forms several rectifiers, in this case four, each formed of a row of stator blades 26. Rectifiers are associated with the fan 16, or a row of rotor blades 24 for redressing the air flow, so as to convert the velocity of the flow into pressure.

The annular wall 34 can have a profile of revolution about the axis 14, e.g., a bullet shape, with a variation of the radius along the axis 14. This variation of the radius can reverse. The annular wall 34 has an inner surface with a double curvature, one of the curvatures being along an axial plane, the other curvature being in a radial plane. It is understood that the radial plane is perpendicular to the axis 14, the axially extending axially and radially.

The stator blades 26 can each include an airfoil extending into the primary flow 18, a platform 36, optionally with a fixing pin (not shown) extending radially in a direction opposite to the direction of the blade. The platforms 36 can be pressed against the inner surface of the annular wall 34.

The outer surface of the annular wall 34 can define an annular gap, e.g., a void, which can extend over the majority of its length. The annular wall 34 can have a series of mounting holes (not shown) for fixing the stator vanes/blades 26, possibly with inserts (not shown).

At least one sealing device, or each sealing device, can comprise at least one circular strip 38 with an inner face and an outer face. The circular strip 38 can be disposed on the inner surface of the annular wall 34. The strip 38 can comprise a metallic material, and can form a ribbon or band such as a foil. The strip 38 can be made of a different material than the annular wall 34. The strip 38 can present an upstream circular edge and a downstream circular edge, the edges being generally parallel. In various embodiments the strip 38 can have a constant thickness. The strip 38 can have a thickness between 0.05 mm and 3.00 mm, for example between 0.20 mm and 0.30 mm, the afore mentioned values being included. The sealing device can comprise a plurality of annular strips 38 on the annular wall 34, in various embodiments the plurality of annular strips 38 are spaced and/or distributed axially along the annular wall 34.

The strip(s) 38 can include an annular layer 40 of abradable material, and a surface covered by the layer of abradable material 40. The covered surface can be an inner surface. Each abradable layer 40 can be disposed axially at the level of each annular row of rotor blades 24. The strips 38 can improve the cohesion of the abradable layer 40 on the annular wall 34. In various embodiments the strips 38 form an intermediate layer whose coefficient of expansion is between 10% and 500% of the coefficient of expansion of the abradable layer 40, for example between 50% and 200%. In various implementations, each abradable layer 40 can be associated with a strip 38. Each strip 38 can extend axially over the majority, in various embodiments over the entire axial length, of the associated abradable layer 40. Each abradable layer 40 can extend axially over the majority, in various embodiments over the entire axial length, of the associated strip 38. The abradable layer 40 can be applied by plasma deposition on a strip 38. The annular wall 34 can have annular shoulders delimiting axially the strips 38 and in various implementations the abradable layers 40.

In various embodiments, the annular wall 34 can be made of a composite material, and can be manufactured by injection according to a method of the RTM (Resin Transfer Molding) type. Such a composite material can comprise a matrix and a fibrous reinforcement. The matrix can comprise an organic material, such as a thermoplastic material, epoxy, polyetherimide (PEI), polyetheretherketone (PEEK). The fibers can be dissociated, with a length less than 3.00 mm, for example less than 0.50 mm. The fibers can be in the form of a fiber preform. Such a preform can comprise a mat of tridimensional woven fibers, and/or a stack of fibrous plies or sheets consisting of fibers arranged in bundles of fibers woven in at least two directions. The fibers can be carbon fibers and/or glass fibers.

A metal material can include aluminum, stainless steel, titanium, iron, nickel, Invar®, or an alloy of the above materials.

According to the scope of the invention, the annular wall 34 is an optional aspect. The strip(s) 38 can integrally form the annular wall 34. The wall 34 can form a structural element to which all the elements in contact are attached, in various embodiments some elements are secured exclusively to the wall 34.

Figure 3:
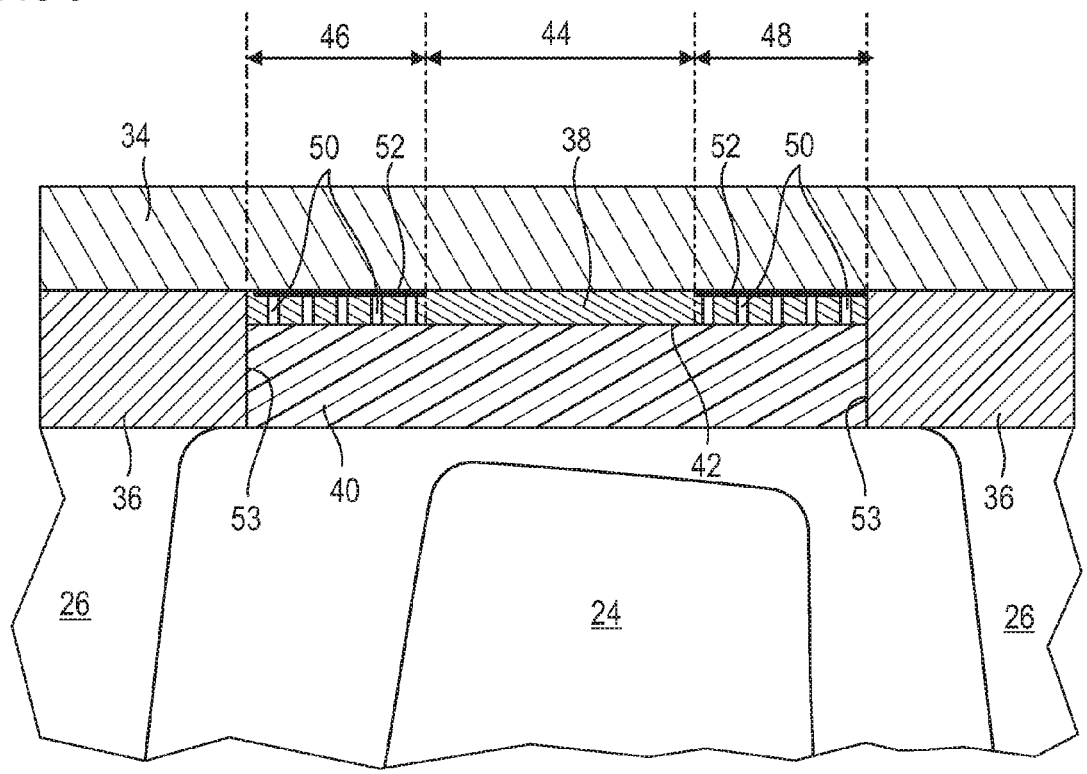
FIG. 3 illustrates a sealing device of the turbomachine shown in FIG. 1 according to various embodiments the invention.

FIG. 3 shows a portion of the wall 34 of the turbomachine 2. A strip 38 is arranged on the annular wall 34. A rotor blade 24 and stator blades 26 with their platforms 36 are visible.

The surface 42 of the strip 38 coated with the abradable layer 40 has a plurality of circular zones, for example with different surface roughnesses. The coated surface 42 can comprise a smooth circular zone 44 where the surface is smooth, and at least one perforated circular zone (46, 48) with a series of perforations 50 distributed over the zone(s) (46, 48). The perforated zone(s) (46, 48) can axially delimit the smooth zone 44. The smooth zone 44 is unitary, and/or uniform in every respect, and can be generally free of perforations. The smooth zone 44 can have a roughness less than the roughness of the perforated zone(s) (46, 48). The smooth zone 44 can have a roughness of between 50 µm and 0.10 µm, for example between 12 µm and 0.50 µm, for example between 3.50 µm and 0.80 microns. A significant increase in roughness can improve the cohesion of the abradable layer 40 on the smooth zone 44. In various embodiments, the coated surface 42 has at least two perforated circular zones (46, 48), namely a first upstream perforated zone 46 and a second downstream perforated zone 48, between which the smooth zone 44 can be disposed. In various embodiments, the coated surface 42 can have an axial alternating of smooth zones and perforated zones.

The strip 38 can be attached to the wall 34, in various implementations directly. The surfaces of the strip 38 and the wall 34 can fit closely, and/or be pressed against each other. The attachment of strip 38 and the wall 34 can be effected with glue 52. Glue 52 can be applied at the perforated zones (46, 48), in various implementations only at the level of the perforated zones (46, 48). The perforations 50 can pass through the strip 38, for example to allow a degassing of glue 52. The perforations 50 can be made by laser, punching, machining, or any other suitable process.

The strip 38 is axially in contact with at least one platform 36 of a stator blade 26, for example with of the whole row of blade platforms 36. In various embodiments, the strip 38 can be in contact with upstream and downstream rows of platforms 36. Platforms 36 can form axial abutments for the strip 38.

The inner surfaces of the abradable layer 40 and platforms 36 delimit the primary flow, they are in line with one another to form a continuous surface. The thickness of the platforms 36 of blades 26 can be substantially equal to the sum of the thickness of the strip 38 and the thickness of the abradable layer 40. Platforms 36 of blades 26 can include stop surfaces 53 which cooperate axially with the strip 38 and which delimit the abradable layer 40.

FIG. 4 outlines a plan view of a portion of the surface 42 of the strip 38 coated with abradable material 40, where the position of a rotor blade tip, for example, a compressor blade or a fan blade, is also represented.

The smooth zone 44 can extend over at least 10% of the coated surface 42, for example over the majority, for example over more than 80%. The smooth zone 44 can be disposed axially in the middle of the coated surface 42. In various embodiments, the zones (44, 46, 48) form annular bands, for example with parallel edges and/or of constant width.

The perforations 50 can be regularly spaced from each other axially and/or angularly. The perforations 50 of at least one, for example of each perforated zone (46, 48) can be spaced in a regular grid, for example by forming the vertices of triangles, or corners of squares. The axial length of the smooth zone 44 can be greater than at least 3 times, for example at least 20 times, for example at least 100 times, for example at least 1000 times, the average spacing between the perforations 50.

At least one, or each perforated zone (46, 48), can comprise at least one perforation per $cm^2$, for example at least 20 perforations per $cm^2$, for example at least 150 perforations per $cm^2$. At least one or each perforated zone (46, 48) can comprise perforations 50 having a diameter less than or equal to 3.00 mm, for example less than or equal to 0.60 mm, for example less than or equal to 0.05 mm.

The strip 38 can extend axially along the length of the rotor blades 24. The radially outer end 54 of the rotor blade 24, or each end 54 of blade 24, can be centered on the abradable layer 40. In various embodiments, the end 54 of the blade 24, or each end 54 of blade 24, is mostly, for example completely disposed axially in the smooth zone 44. Ends 54 of the blades 24 can have a contact portion 56. Each contact portion 56 has a length that is less than 80% the length of the end 54, for example less than 20%. Each contact portion 56 can be disposed axially in the smooth zone 44.

The blade 24 includes a leading edge 58 and a trailing edge 60. Smooth zone 44 can be disposed between the leading edge 58 and trailing edge 60 of the rotor blade 24. At least one perforated zone (46, 48) can be disposed at the leading edge 58 and/or at the trailing edge 60 of the blade 24.

The teaching of the invention can also be applied to the sealing device at the fan strip of the turbomachine. It can include an annular abradable material layer and a surface covered by the abradable layer. The surface comprises a smooth circular zone and a perforated circular zone with perforations through both the strip and the abradable layer. In various embodiments, the perforations are distributed over the perforated area and can allow communication with the noise reducing device of the fan. The present teaching can also be applied to a seal support, such as a labyrinth seal. It can also be applied to a turbine sealing device, for high or low-pressure.

What is claimed is:

1. A sealing device of an axial turbomachine, said sealing device comprising:
    a circular strip with an outer surface and an inner surface; and
    an annular layer of abradable material disposed on one of the outer and inner surfaces of the strip, the abradable layer structured and operable to provide a sealing with a turning component of the turbomachine relative to the strip, the surface of the strip covered by the abradable layer comprising:
    at least one circular perforated zone with a series of perforations distributed over the perforated zone; and
    a smooth circular zone, wherein the axial length of said smooth circular zone is at least five times greater than the average spacing between the perforations; and
    wherein the perforated zone and the series of perforations are respectively a first circular perforated zone and a first series of perforations, and wherein the surface of the strip covered by the abradable layer further comprising a second perforated circular zone with a second series of perforations distributed over the second zone, the smooth zone being disposed axially between the first zone and the second zone.

2. The sealing device according to claim 1, wherein the circular strip is a metal strip and the surface of the strip covered by the abradable layer is an inner surface of the strip.

3. The sealing device according to claim 2, wherein the smooth zone is axially delimited by the perforated zone, and the smooth zone extends over one of:
- at least 20% of the surface of the strip covered by the abradable layer; and
- at least 80% of the surface of the strip covered by the abradable layer.

4. The sealing device according to claim 3, wherein the perforations of the perforated zone are spaced in a regular grid, and the axial length of the smooth zone is greater than twenty times the average spacing between the perforations.

5. The sealing device according to claim 4, wherein the circular strip has a constant thickness of at least one of:
- between 0.10 mm and 0.60 mm; and
- between 0.15 mm and 0.20 mm.

6. The sealing device according to claim 5, wherein the perforated zone comprises at least one of:
- at least 5 perforations per $cm^2$ having a diameter less than or equal to 2.00 mm;
- at least 30 perforations per $cm^2$ having a diameter less than or equal to 0.15 mm; and
- at least 100 perforations per $cm^2$ having a diameter less than or equal to 0.09 mm.

7. The sealing device according to claim 1, wherein the abradable layer clogs the perforations of the perforated zone.

8. The sealing device according to claim 1, wherein the abradable layer extends axially over the entire axial length of the strip.

9. The sealing device according to claim 8, wherein the strip extends axially over the entire axial length of the abradable layer.

10. The sealing device according to claim 8 further comprising an annular wall that comprises an inner surface on which the strip is disposed.

11. The sealing device according to claim 10, wherein the annular wall comprises a plurality of annular layers of abradable material and a plurality of the strips that are interposed between the wall and several abradable layers.

12. The sealing device according to claim 10, wherein the strip is attached to the annular wall with one of a glue and an adhesive applied on at least one perforated zone.

13. The sealing device according to claim 12, wherein the annular wall comprises one of:
- an organic resin and a fiber preform; and
- an organic resin and a fiber preform comprising at least one of glass fibers or carbon.

14. The sealing device according to claim 13, wherein the wall comprises at least one annular row of stator blades with platforms fixed to the wall forming an annular row, the strip being delimited axially on one of an upstream edge and a downstream edge by the annular row of blade platforms.

15. The sealing device according to claim 14, wherein the thickness of the platform of stator blades is substantially equal to the sum of the thickness of the strip and the thickness of the abradable layer.

16. The sealing device according to claim 14, wherein the blade platforms comprise stop surfaces that cooperate axially with the strip.

17. The sealing device according to claim 10, wherein the annular wall comprises at least one annular flange that extends radially.

18. A turbomachine, said turbomachine comprising:
- a sealing device, the sealing device comprising:
  - a circular strip with an outer surface and an inner surface;
  - an annular layer of abradable material disposed on one of the outer and inner surfaces of the strip, the abradable layer structured and operable to provide a sealing with a turning component of the turbomachine relative to the strip, the surface of the strip covered by the abradable layer comprising:
    - at least one circular perforated zone with a series of perforations distributed over the perforated zone; and
  - a smooth circular zone; and
- an annular row of rotor blades cooperating by abrasion with the abradable layer, and each of said rotor blades comprising an outer end with a contact portion which has a length that is less than 80% the length of said end, and which is enclosed axially within said smooth circular zone.

19. The turbomachine according to claim 18, wherein each rotor blade comprises a leading edge and a trailing edge, the smooth zone being disposed axially predominantly between the leading edge and trailing edge of the blades.

20. The turbomachine according to claim 18, wherein the blades comprise fan blades.

21. A sealing device of an axial turbomachine, said sealing device comprising:
- a circular strip with an outer surface and an inner surface;
- an annular layer of abradable material disposed on one of the outer and inner surfaces of the strip, the abradable layer structured and operable to provide a sealing with a turning component of the turbomachine relative to the strip, the surface of the strip covered by the abradable layer comprising:
  - at least one circular perforated zone with a series of perforations distributed over the perforated zone; and
- a smooth circular zone; and
- an annular wall that comprises an inner surface on which the strip is disposed;
- the strip being attached to the annular wall with one of a glue and an adhesive applied on at least one perforated zone; and
- the smooth circular zone being free of said glue or of said adhesive.

* * * * *